Figure 1:
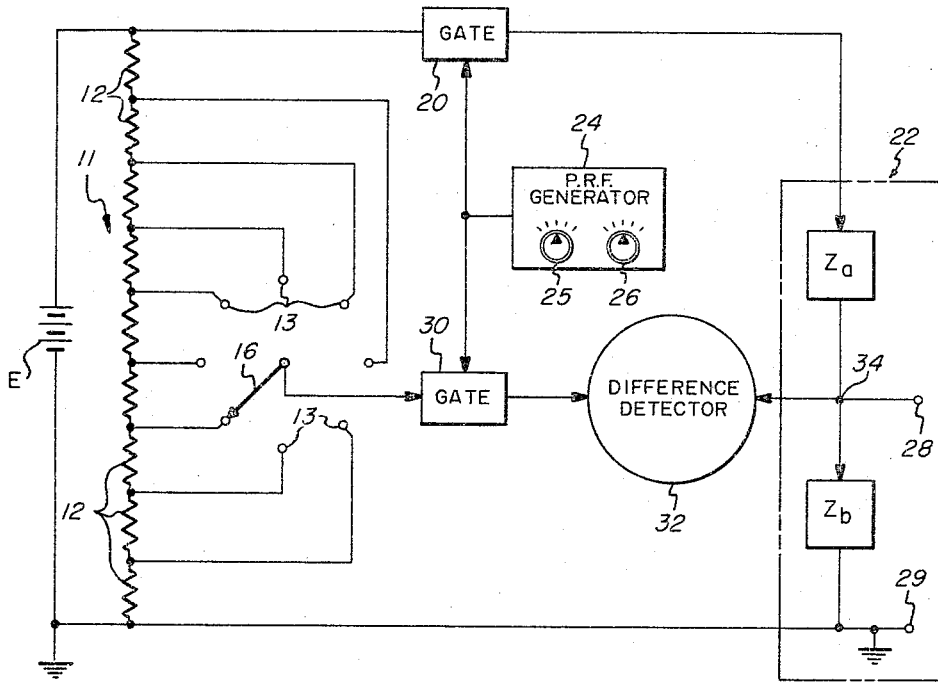

INVENTORS
DENIS F. O'LEARY
CHARLES I. CIMILLUCA
BY
John H. Gallagher
ATTORNEY 3,324,390
APPARATUS FOR DETERMINING THE VOLTAGE RATIO OF A VOLTAGE DIVIDER THAT IS ENERGIZED BY PULSED SIGNALS
Denis F. O'Leary, East Northport, and Charles I. Cimilluca, Bronx, N.Y., assignors to Sperry Rand Corporation, Great Neck, N.Y., a corporation of Delaware
Filed Sept. 4, 1963, Ser. No. 306,563
8 Claims. (Cl. 324—63)

This invention relates to apparatus for simply and accurately performing a voltage ratio measurement on a voltage divider energized by pulsed signals.

In the testing of pulsed high power electronic equipment such as klystron tubes, for example, it is not convenient to measure directly the voltage of the high power output pulses. It is customary to couple across the output of a tube a voltage divider whose impedance ratio is of the order of one thousand to one, and then make the voltage measurement on the divided-down output pulse therefrom whose magnitude is only one-thousandth of the voltage of the pulse from the tube. Equipment for making measurements of voltage at the reduced value is readily available. The voltage dividers used for the purpose just described customarily consist of two series connected capacitors of different values, wherein the divided-down voltage pulse is taken from a terminal coupled to the common connection between the two capacitors.

In the past, voltage ratio measurements have been made on voltage dividers by connecting the voltage divider as a branch of a bridge circuit, wherein each of the two elements of the voltage divider constitute the respective arms of the bridge. The other branch of the bridge was comprised of a precision ratio transformer, and a detector or null meter was connected between the two branches in the usual way. The bridge was excited by an audio signal and the precision ratio transformer was adjusted until a null was detected. Although apparatus of this type is useful for many purposes it may not give a truly accurate indication of the voltage ratio across the voltage divider when the divider is energized by pulsed signals. This results from the fact that the bandwidth limitations of the voltage divider and its associated leads, etc., cause its response to pulsed signals to be different from its response to audio frequency sine waves. Consequently, the voltage ratio measurement taken with audio signal excitation may be in error by several percentage points. In many instances this margin of error is not permissible. Moreover, since precision ratio transformers are narrow band devices, their accuracy is seriously degraded when energized by pulsed signals. Another disadvantage of the precision ratio transformer is its voltage limitation, usually 1000 volts. Resistance dividers, on the other hand, are currently available which will operate to 200 kv.-D.C. at accuracies approaching ±0.01% (100 parts per million).

It therefore is a principal object of this invention to provide apparatus for performing simple and highly accurate voltage ratio measurements on voltage divider networks.

Another object of this invention is to provide apparatus for performing voltage ratio measurements on voltage divider networks energized by pulsed signals.

A further object of this invention is to perform voltage comparison measurements on a voltage divider network energized by pulsed signals with means comprising a highly accurate voltage comparison standard energized by a D.C. voltage.

A still further object of the invention is to provide means for performing votage comparison measurements on a test voltage divider energized by pulsed signals corresponding to those to be encountered in its intended operation, the pulsed signal being derived from a D.C. voltage source which also energizes a precision resistive voltage divider that provides a reference voltage for comparison with the divided-down voltage pulses produced across a portion of the test voltage divider.

Figure 2:
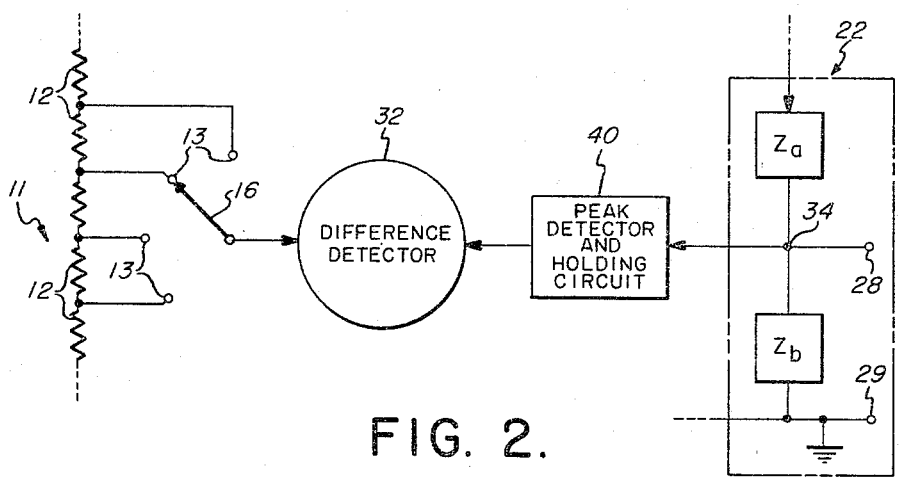
Figure 3:
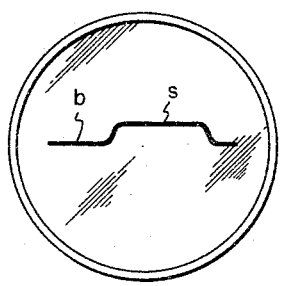

The invention will be described by referring to the accompanying drawings wherein:

FIG. 1 is a schematic diagram, partly in block form illustrating an embodiment of the present invention;

FIG. 2 is a schematic diagram, mostly in block form, illustrating a variation in that part of the circuit of FIG. 1 relating to the means for comparing the voltages produced across a portion of the divider under test and the resistive reference standard; and FIG. 3 is a simplified sketch illustrating the type of presentation seen on the face of an oscilloscope forming part of the difference detector when the two voltage pulse signals being compared are of unequal magnitude.

In accordance with the preferred embodiment of the present invention, a precision resistive voltage divider having a variable voltage ratio is energized by a source of D.C. voltage. A gating circuit connects the voltage divider to be tested, or calibrated, to the same D.C. voltage source. The operation of the gating circuit is controlled by a pulse generator which produces pulses of the same duration and repetition frequency as the pulse source to which the voltage divider under test ultimately will be connected. The top point at which the divided-down voltage of the voltage divider under test is produced, is connected as one input to a difference detector adjustable tap point at which the divided-down voltage from the precision resistive voltage divider is obtained, is connected as the second input to the difference detector. This second input to the difference detector, however, is coupled through a second gating circuit which also is controlled by the aforesaid pulse generator. Consequently, the divided-down voltage pulse signals of the voltage divider under test are compared against the synchronously gated divided-down voltage pulse signals from the precision resistive voltage divider. The precision resistive voltage divider used as the reference preferably has an adjustable voltage ratio so that a null indication may be achieved in the detector.

The described apparatus thus tests, or calibrates, the voltage divider under pulsed conditions closely simulating its intended operating conditions, yet affords the accuracy, reliability and stability of a D.C. reference standard, thus avoiding the distortion and inaccuracy caused by phase shift and bandwidth limitations that are associated with A.C. circuits.

For a detailed description of the present invention, reference now will be made to FIG. 1 wherein a reference direct current (D.C.) voltage divider 11 is comprised of a plurality of precision resistors 12 that are series connected and provided with intermediate taps 13 to afford various voltage ratios that may be selected by means of switch 16. Other types of D.C. resistive voltage dividers may be employed, such as precision potentiometers, or a Kelvin-Varley type voltage divider, for example. A D.C. voltage source E is connected across opposite ends of D.C. voltage divider 11, and the lower side of this combination is grounded, as illustrated.

The high voltage side of the D.C. voltage source E is coupled through gate 20 to the voltage divider 22 whose voltage ratio is to be tested or calibrated. A P.R.F. pulse generator 24 is coupled to gate 20 and produces a succession of pulses which enables gate 20 for the duration of their occurrences, thus passing to the voltage divider 22 voltage pulses whose magnitudes are equal to the potential of voltage source E. P.R.F. generator 24 has independent controls 25 and 26 for adjusting the pulse duration and pulse repetition frequency of the output pulses therefrom so that the voltage divider 22 may receive through gate 20 a succession of pulses that simulate as closely as possible the pulsed input signals that it will receive during its intended operation.

Voltage divider 22 is comprised of the series connected impedances $Z_a$ and $Z_b$, which in practice might be small valued capacitors, although the present invention is not restricted to any particular types of elements in the voltage divider. The divided-down voltage is taken from terminals 28 and 29 of voltage divider 22. The voltage appearing at terminals 28 and 29 will bear the relationship $$\frac{Z_b}{Z_a+Z_b}$$

of the magnitude of the voltage source E. Of course, because of the operation of P.R.F. generator 24 and gate 20, the output of the terminals 28 and 29 will be in the form of successive pulses having equal amplitude less than the voltage of D.C. voltage source E. For convenience, it frequently is desired that the voltage ratio of voltage divider 22 be one thousand to one.

A second gate 30 is connected to switch 16 and is controlled in synchronism with gate 20 by means of the pulsed output from P.R.F. generator 24. Gate 30 therefore passes to a difference detector 32 pulses whose magnitudes are equal to the potential of D.C. voltage source E divided by the resistance ratio of D.C. voltage divider 11. Gate 30 therefore couples to difference detector 32 a selectable reference voltage to compare against the divided-down voltage from voltage divider 22, this latter voltage being coupled from the point 34 to a second input of the difference detector 32. Difference detector 32 may take a number of different forms; a Tektronix oscilloscope with a type D differential preamplifier has been used with considerable success.

The likeness of the circuit of FIG. 1 to a bridge circuit is believed to be evident. D.C. voltage divider 11 forms one branch of the bridge circuit and voltage divider 22 forms the other parallel branch. The switch 16 and the point 34 provide connections to intermediate points on the respective branches, in the usual manner.

In operation, controls 25 and 26 of P.R.F. generator 24 are adjusted to provide gating pulses therefrom that substantially correspond to the pulsed signals of the intended environment in which voltage divider 22 will be operating. With this condition fulfilled, the voltage at point 34 of voltage divider 22 will be the divided-down voltage that is to be measured or calibrated, and this voltage is coupled to difference detector 32. If the divided-down voltage sampled by switch 16 on D.C. voltage divider 11 is different from the divided-down voltage across impedance $Z_b$, a presentation similar to that illustrated in FIG. 3 will appear on the face of the oscilloscope that comprises part of difference detector 32. In FIG. 3, the step $s$ appearing on the base line $b$ indicates the amount by which the divided-down pulse voltage across impedance $Z_b$ differs from the divided-down reference voltage sampled by switch 16. When this condition occurs, switch 16 is adjusted until the step $s$ disappears on the presentation of the oscilloscope, which indicates that the voltage levels of the two series of pulses coupled into difference detector 32 are substantially identical. D.C. voltage divider 11 may be comprised of extremely precise and stable resistive elements. The voltage ratio sampled by switch 16 is extremely accurate and typically may have an accuracy of ±0.01% (±100 parts per million) or better for a resistive ratio of 1000 to 1. This is attributable in large part to the fact that the voltage divider 11 which acts as the standard reference is functioning in a D.C. circuit and therefore is substantially free of inaccuracies due to phase shift and bandwidth limitations associated with A.C. and pulsed circuits.

An alternative method of operating the apparatus of FIG. 1 is to set switch 16 so that a known voltage ratio is provided by D.C. voltage divider 11. Then if a step $s$ appears on the oscilloscope of difference detector 32, as illustrated in FIG. 3, the magnitude of this step may be measured and multiplied by the known voltage sensitivity characteristic of the oscilloscope to provide an accurate representation of the magnitude of the divided-down voltage pulses from voltage divider 22.

One of the primary advantages of the apparatus illustrated in FIG. 1 is that in addition to having an extremely accurate D.C. voltage divider 11 which serves as the standard reference, the inclusion of P.R.F. generator 24 and gates 20 and 30 permits the voltage divider 22 to be tested or calibrated under pulsed conditions simulating those of its intended environment. This latter feature reduces the possibility of error which might otherwise arise if pulse divider 22 were tested with an input signal other than the desired pulsed input. For example, in the prior art apparatus described above, it was found that the voltage ratio varied as a function of the frequency of the energizing audio signals, and it is to be expected that the response of the voltage divider would be even more different for the pulsed signals that energize the divider during its intended operation.

A variation in the means for comparing and detecting a difference in the magnitudes of the reference pulses from gate 30 and the divided-down voltage pulses from voltage divider 22 is illustrated in the partial schematic diagram of FIG. 2. In this embodiment, the divided-down voltage on D.C. voltage divider 11 is coupled directly via switch 16 to the difference detector 32 as a D.C. voltage, that is, gate 30 of FIG. 1 has been omitted. On the other hand, the divided-down voltage pulses at point 34 in voltage divider 22 are coupled through a peak detector and holding circuit 40 which establishes a D.C. voltage level corresponding to the magnitude of the divided-down voltage pulses. This D.C. level then is coupled to the difference detector 32 for comparison against the reference D.C. voltage level coupled from D.C. voltage divider 11. The remainder of the circuit would be substantially identical in all other respects to the circuit illustrated in FIG. 1.

In addition to the above-cited advantages of the present invention, the apparatus of this invention also provides the advantage that the bandwidth characteristics and pulse shape of the divided-down voltage pulses from voltage divider 22 are discernable from the oscilloscope presentation appearing in the difference detector 32. That is, any pulse distortion will appear on the oscilloscope presentation as some type of curved line rather than the straight lines illustrated in FIG. 3. With some experience the operator of the equipment can learn to interpret the curved line so as to gain an understanding of the characteristics of the voltage divider being calibrated.

While the invention has been described in its preferred embodiments, it is to be understood that the words which have been used are words of description rather than limitation and that changes within the purview of the appended claims may be made without departing from the true scope and spirit of the invention in its broader aspects.

What is claimed is:
1. Apparatus for determining the voltage division ratio of a test voltage divider capable of being energized by voltage pulses of a first magnitude to provide divided-down voltage pulses of a second magnitude across a portion of said test voltage divider, said apparatus comprising,
  (a) gating means connected in series with said test voltage divider,
  (b) a precision resistive voltage divider connected in parallel with the series arrangement of said gating means and said test voltage divider,
  (c) a D.C. voltage source connected across said precision resistive voltage divider to provide a divided-down D.C. voltage across a portion of said precision resistive voltage divider,

(d) a pulse generator for actuating said gating means to convert a D.C. voltage from said D.C. voltage source to said voltage pulses of a first magnitude, and (e) means for comparing the divided-down voltages of said two voltage dividers.

2. Apparatus for determining the voltage ratio of a voltage divider, said apparatus comprising, (a) a bridge circuit comprised of two parallel branches, (b) a D.C. voltage source connected across said bridge circuit, (c) a precision resistive voltage divider comprising a first branch of said bridge circuit such that said D.C. voltage source produces a divided-down D.C. voltage across a portion of said first branch, (d) a test voltage divider, (e) gating means connected in series with said test voltage divider, the series combination of said test voltage divider and said gating means comprising a second branch of said bridge circuit, (f) a pulse generator for actuating said gating means to convert a D.C. voltage from said D.C. voltage source to voltage pulses of a first magnitude whereby voltage pulses of a second magnitude are produced across a portion of said test voltage divider, and (g) means connected between said parallel branches for comparing the magnitudes of said divided-down D.C. voltage and said voltage pulses of a second magnitude to determine the condition of balance of said bridge.

3. The combination claimed in claim 2 wherein said means connected between said branches includes, second gating means for converting said divided-down D.C. voltage to divided-down voltage pulses for comparison with said voltage pulses of a second magnitude.

4. The combination claimed in claim 3 wherein, said pulse generator is connected to said two gating means for synchronously controlling said two gating means to permit pulse comparison of said two divided-down voltages.

5. Apparatus for determining the voltage ratio of a voltage divider energized by pulsed electrical signals, said apparatus comprising, (a) a precision resistive voltage divider having a third terminal intermediate first and second terminals, (b) a D.C. voltage source connected across the first and second terminals of said precision resistive voltage divider, (c) gating means connected in series with a test voltage divider having a third terminal intermediate first and second terminals, the series combination of said gating means and said test voltage divider being connected in parallel with said precision resistive voltage divider, (d) a pulse generator for actuating said gating means to convert a D.C. voltage from said D.C. voltage source to voltage pulses of a first magnitude impressed across the first and second terminals of said test voltage divider to provide voltage pulses of a second magnitude at said third terminal, and (e) means connected to the respective third terminals of said two voltage dividers for comparing the magnitudes of said divided-down D.C. voltage and said divided-down voltage pulses of a second magnitude.

6. Apparatus for determining the voltage division ratio of a test voltage divider capable of being energized by voltage pulses of a first magnitude to provide voltage pulses of a second magnitude across a portion of said test voltage divider, said apparatus comprising, (a) gating means connected in series with said test voltage divider, (b) a precision resistive voltage divider connected in parallel with the series combination of said gating means and said test voltage divider, (c) a D.C. voltage source connected across said precision resistive voltage divider to provide a divided-down D.C. voltage across a portion of the precision resistive voltage divider, (d) second gating means for converting said divided-down D.C. voltage to divided-down voltage pulses, (e) means for controlling said two gating means in synchronism, (f) means for comparing the magnitudes of said voltage pulses of a second magnitude and said divided-down voltage pulses, and (g) oscilloscope means for displaying a pulse indicative of a difference in the magnitude of said compared pulses.

7. Apparatus for determining the voltage division ratio of a test voltage divider capable of being energized by voltage pulses of a first magnitude to provide divided-down voltage pulses of a second magnitude across a portion of said test voltage divider, said apparatus comprising, (a) gating means connected in series with said test voltage divider, (b) a precision resistive voltage divider connected in parallel with the series combination of said gating means and said test voltage divider, (c) a D.C. voltage source connected across said precision resistive voltage divider to produce a divided-down D.C. voltage across a portion of said precision resistive voltage divider, (d) a pulse generator for actuating said gating means to convert a D.C. voltage from said D.C. voltage source to said voltage pulses of a first magnitude.

(e) means for converting said divided-down voltage pulses of a second magnitude to a peak detected and clamped voltage of equivalent amplitude, and (f) means for comparing the magnitudes of said peak detected and clamped voltage and said divided-down D.C. voltage.

8. The combination claimed in claim 7 and further including, oscilloscope means for displaying a pulse indicative of the difference in the magnitudes of said compared signals.

References Cited

UNITED STATES PATENTS

| | | | |
|---|---|---|---|
| 2,803,799 | 8/1957 | Siegel et al. | 324—63 |
| 3,012,192 | 12/1961 | Lion | 324—57 |

RUDOLPH V. ROLINEC, *Primary Examiner.*

WALTER L. CARLSON, *Examiner.*

W. H. BUCKLER, E. E. KAUBASIEWICZ,
*Assistant Examiners.*